United States Patent
Bell et al.

[11] Patent Number: 5,301,321
[45] Date of Patent: Apr. 5, 1994

US005301321A

[54] METHOD AND SYSTEM FOR THE MINIMIZATION OF CONFLICTING ACTIVITIES WITH RESPECT TO AN OBJECT STORED WITHIN A DATA PROCESSING SYSTEM

[75] Inventors: Laura K. Bell, Grand Prairie; Janis D. Jones, Carrollton; Daniel J. Kardell, Keller; Thanh-Nha Nguyen; Keith A. Varga, both of Irving, all of Tex.

[73] Assignee: International Business Machines Corporation, Armonk, N.Y.

[21] Appl. No.: 839,862

[22] Filed: Feb. 21, 1992

[51] Int. Cl.⁵ .............................................. G06F 9/06
[52] U.S. Cl. .............................. 395/650; 364/DIG. 1; 364/259.7; 364/264.6; 364/281.8
[58] Field of Search ................. 364/DIG. 1 MS File; 395/425, 650, 155, 159

[56] References Cited
U.S. PATENT DOCUMENTS 4,525,780  6/1985  Bratt et al. ........................ 395/425
4,954,945  9/1990  Inoue ............................ 364/DIG. 1

Primary Examiner—Thomas M. Heckler
Attorney, Agent, or Firm—Lisa Yociss; Andrew J. Dillon

[57] ABSTRACT

A method and system for the minimization of conflicting activities with respect to an object stored within a data processing system are disclosed. An object within a data processing system may be the subject of multiple activities by users of that system. A temporary record of all current activities with respect to an object is stored within a state mask which has been established in association with that object. Thereafter, prior to permitting a proposed activity, the state mask is utilized to automatically determine if the proposed activity represents a conflict with an existing activity.

24 Claims, 4 Drawing Sheets

METHOD AND SYSTEM FOR THE MINIMIZATION OF CONFLICTING ACTIVITIES WITH RESPECT TO AN OBJECT STORED WITHIN A DATA PROCESSING SYSTEM

BACKGROUND OF THE INVENTION

1. Technical Field

The present invention relates in general to the field of data processing systems and in particular to the field of minimizing conflicting activities with respect to an object stored within a data processing system. Still more particularly, the present invention relates to the field of automatically determining if a proposed activity represents a conflict with an existing activity with respect to an object stored within a data processing system by utilizing an established state mask.

2. Description of the Related Art

Graphical user interfaces are well known in the art. Users may select a particular activity for the data processing system to perform utilizing input devices such as a keyboard or a "mouse." These particular activities such as "print document" or "select a document" may be represented to the user in the form of function keys graphically displayed on the computer display screen and selected by striking a particular key on the keyboard, or as icons to be selected utilizing a graphical pointing device such as a "mouse". A pointer on the display screen represents the current location of the "mouse." By moving the "mouse", a user may move the pointer around within the computer display screen.

Icons may also be graphical representations of a particular activity to be performed. For example, the "select a document" activity may be graphically represented by a graphic representation of a filing cabinet. A user may select this activity by moving the "mouse" to position the pointer over the graphic representation of the filing cabinet. The user may then "click" the "mouse" button twice to indicate a selection of a particular graphic representation.

A filing cabinet, as displayed by a graphical user interface, may contain multiple "drawers" each including multiple "files." The "files" are organized in the "drawers" of the filing cabinet by a user in a manner similar to that utilized in a real world filing system. A user may place multiple copies of a particular file in multiple drawers of the same filing cabinet, or in multiple drawers of different filing cabinets. Each file thus graphically depicted is represented by a separate icon. If the same file is graphically represented in two different filing cabinets, each filing cabinet will include a separate icon which graphically represents the file. Therefore, two file icons may appear on the display screen for a single file object.

A problem may arise if a user attempts to perform an activity on one icon which graphically represents a file and then attempts to perform a conflicting activity on another icon which graphically represents the same file. For example, a user may have stored a single document as "File 1" in two different filing cabinets. The user may select "File 1" from filing cabinet 1 and attempt to print that file, and then select "File 1" from filing cabinet 2 and attempt to shred that file. An attempt to print and shred the same file, at the same time, are clearly conflicting activities and may produce an unpredictable result.

Therefore, it should be obvious that a need exists for an improved method and system whereby conflicting activities are minimized with respect to an object stored within a data processing system.

SUMMARY OF THE INVENTION

It is therefore one object of the present invention to provide an improved method and system for minimizing conflicting activities with respect to an object stored within a data processing system.

It is another object of the present invention to provide an improved method and system for establishing a state mask in association with an object stored within a data processing system which may be utilized to minimize conflicting activities with respect to that object.

It is yet another object of the present invention to provide an improved method and system for automatically determining if a proposed activity with respect to an object represents a conflict with an existing activity by utilizing a state mask associated with that object.

The foregoing objects are achieved as is now described. A method and system for the minimization of conflicting activities with respect to an object stored within a data processing system are disclosed. An object within a data processing system may be the subject of multiple activities by users of that system. A temporary record of all current activities with respect to an object is stored within a state mask which has been established in association with that object. Thereafter, prior to permitting a proposed activity, the state mask is utilized to automatically determine if the proposed activity represents a conflict with an existing activity.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
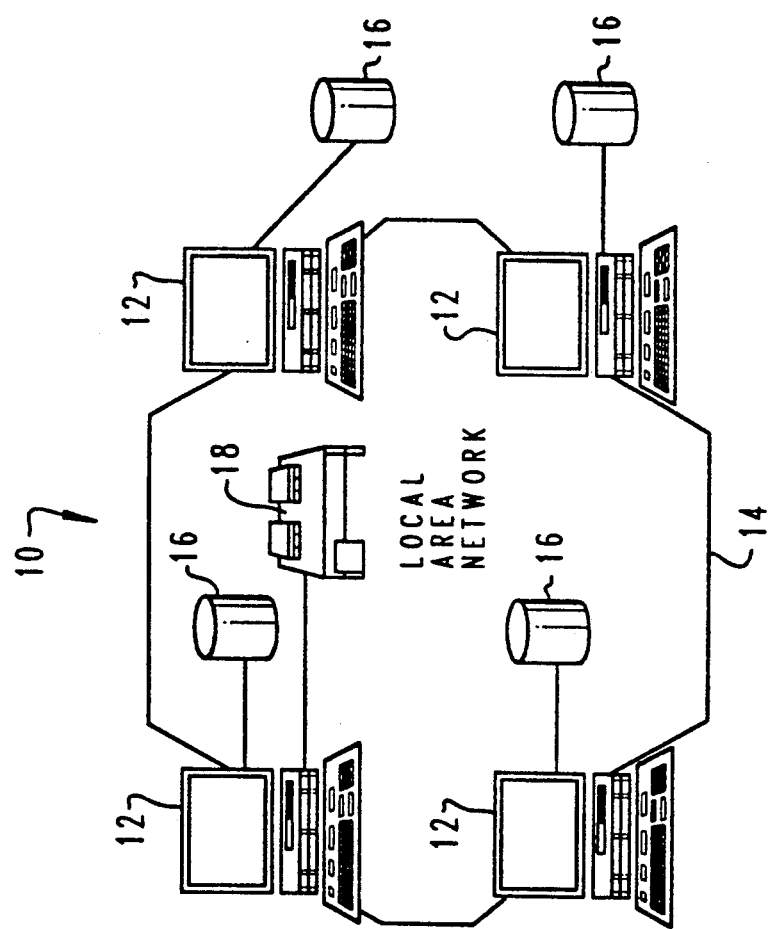
FIG. 1 depicts a pictorial representation of a data processing system which may be used to implement the method and system of the present system.

With reference now to the figures and in particular with reference to FIG. 1, there is depicted a pictorial representation of a data processing system 10 which may include a plurality of computers 12 which may be connected together in a local area network 14. Of course, those skilled in the art will appreciate that a plurality of intelligent work stations coupled to a host processor may be utilized to implement such network.

As is common in such data processing systems, each individual computer may be coupled to a storage device 16 and/or a printer/output device 18. One or more such storage devices 16 may be utilized to store the various data objects or documents which may be periodically accessed and processed by a user within data processing system 10, in accordance with the method and system of the present invention. In a manner well known in the prior art, each such data processing procedure or document may be stored within a storage device 16, which may be associated with a resource manager or library service, which is responsible for maintaining and updating all resource objects associated therewith.

Figure 2:
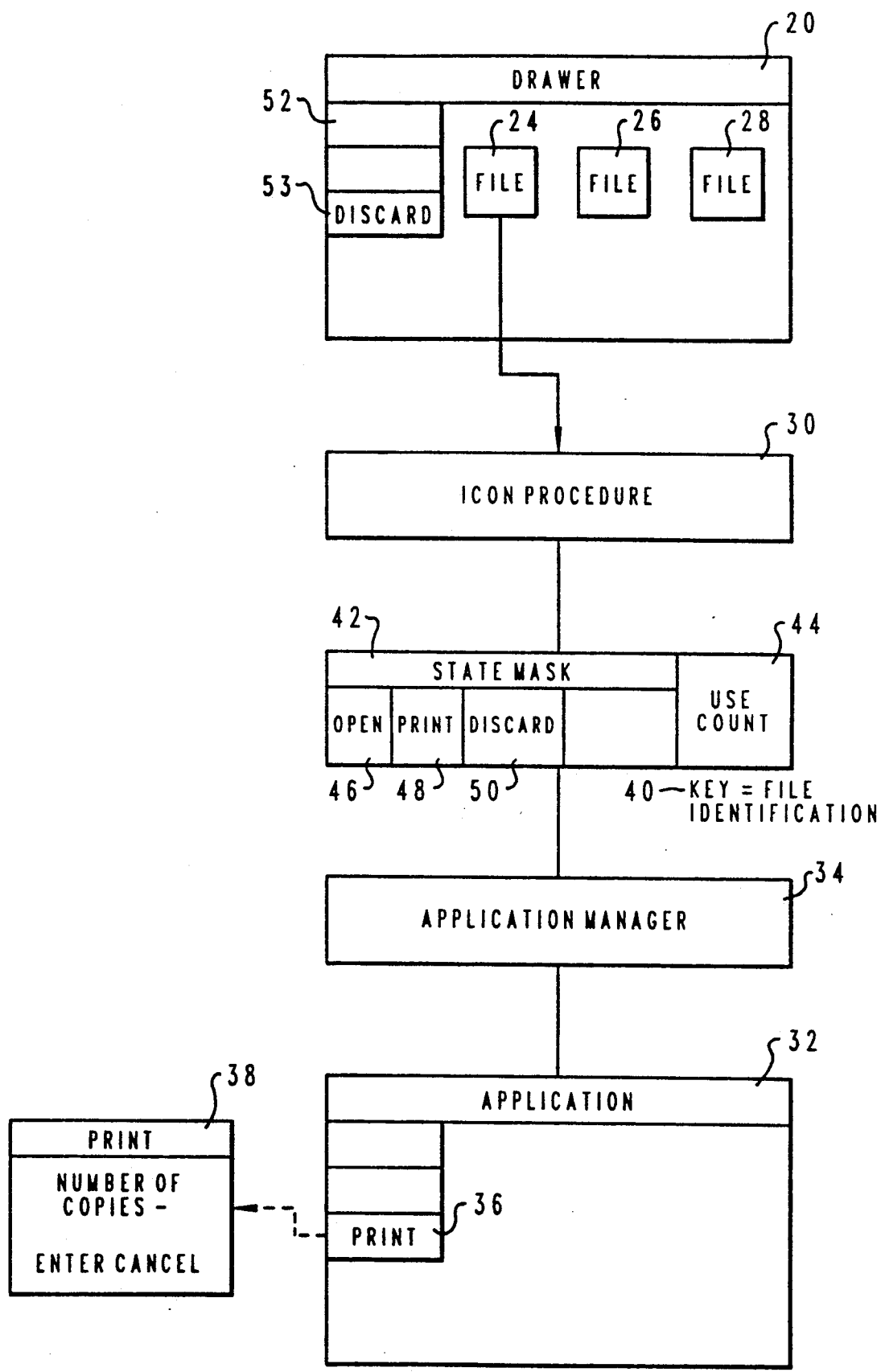
FIG. 2 depicts a pictorial representation of an object graphically represented within a computer screen and a schematic representation of the underlying processes which demonstrate two activities within a drawer of a filing cabinet.

Referring now to FIG. 2, there is depicted a pictorial representation of an object graphically represented within a computer screen and a schematic representation of the underlying processes which demonstrate two activities within a drawer of a filing cabinet. The filing cabinet is a logical representation of documents stored within data processing system 10. Drawer 20 contains iconic representations of file 24, a file 26, and a file 28. An icon procedure 30 is typically utilized to receive and process activity with respect to file 24. Such activity is generally the result of a user graphically selecting, opening, or utilizing an iconic representation of file 24. Similarly, icon procedures may exist with respect to file 26, file 28, and all other files which may be contained within drawer 20.

In known graphical user interface systems, a user may invoke an application 32 which is associated with file 24, by positioning a mouse pointer over a file 24 icon and "clicking" a mouse button twice. Once application 32 has been invoked, a link is established between icon procedure 30 and application 32 via an application manager 34. Application manager 34 is used to control all activities initiated with respect to application 32. These activities may be the result of a user graphically selecting, opening, or utilizing an associated icon, or by entering commands directly via a command line. For example, these activities may include commands such as print 36, which may be graphically represented within the computer screen by a print interface 38.

A key 40, in one embodiment, is created by icon procedure 30, or by application manager 34 and may include an identification of state mask 42 and a use count 44. Each icon procedure and application manager will include an associated key. In accordance with the depicted embodiment of the present invention, an application manager may create a key, if the application was invoked as described above, utilizing a command line. Use count 44 is utilized to indicate the number of current activities with respect to icon procedure 30, and application manager 34. Use count 44 may be utilized to automatically delete key 40, when all activities associated with key 40 have ceased, thus conserving data storage space.

State mask 42 includes a plurality of status bits which automatically indicate a status for all current activities. For example, state mask 42 may include an open bit 46, a print bit 48, and a discard bit 50. These bits may be set or reset to indicate that an application is being opened, is in the process of printing its associated file, or is discarding its associated file.

Still referring to FIG. 2, it may be seen that a user may open application 32, utilizing the file 24 icon. Key 40 will be automatically created, if it does not already exist, and use count 44 will be incremented. Application manager 34 will then invoke application 32, while icon procedure 30 sets open bit 46 within state mask 42, to indicate application 32 is in the process of opening. When this process is completed, icon procedure 30 will reset open bit 46. Those skilled in the art will appreciate that either icon procedure 30 or application manager 34 may utilize or access state mask 46 to set and reset status bits.

A user may also desire to print the contents of file 24. In such a situation, the user selects print 36. Application manager 34 will then utilize or access state mask 42 to determine if there are any current activities which may represent a conflict with the print process. Since in the present scenario there are no conflicting current activities, application manager 34 sets print bit 48. Print interface 38 will then be displayed.

A user might then desire to discard the contents of file 24. In order to discard, the user selects a menu 52 which contains a discard option 53. Icon procedure 30 again accesses state mask 42 and determines that print bit 48 is set. A discard would clearly conflict with the current print activity. Therefore, in accordance with the depicted embodiment of the present invention, discard option 53 is disabled, to indicate to a user that the discard process is prohibited. Discard option 53 remains disabled as long as menu 52 is displayed. Those skilled in the art will appreciate that the prohibited activity may be indicated in an alternate manner, such as by displaying a message indicating that the activity is prohibited.

Once printing is completed, application manager 34 will reset print bit 48. After print bit 48 is reset, discard option 53 will appear enabled upon a user reselecting menu 52.

Figure 3:
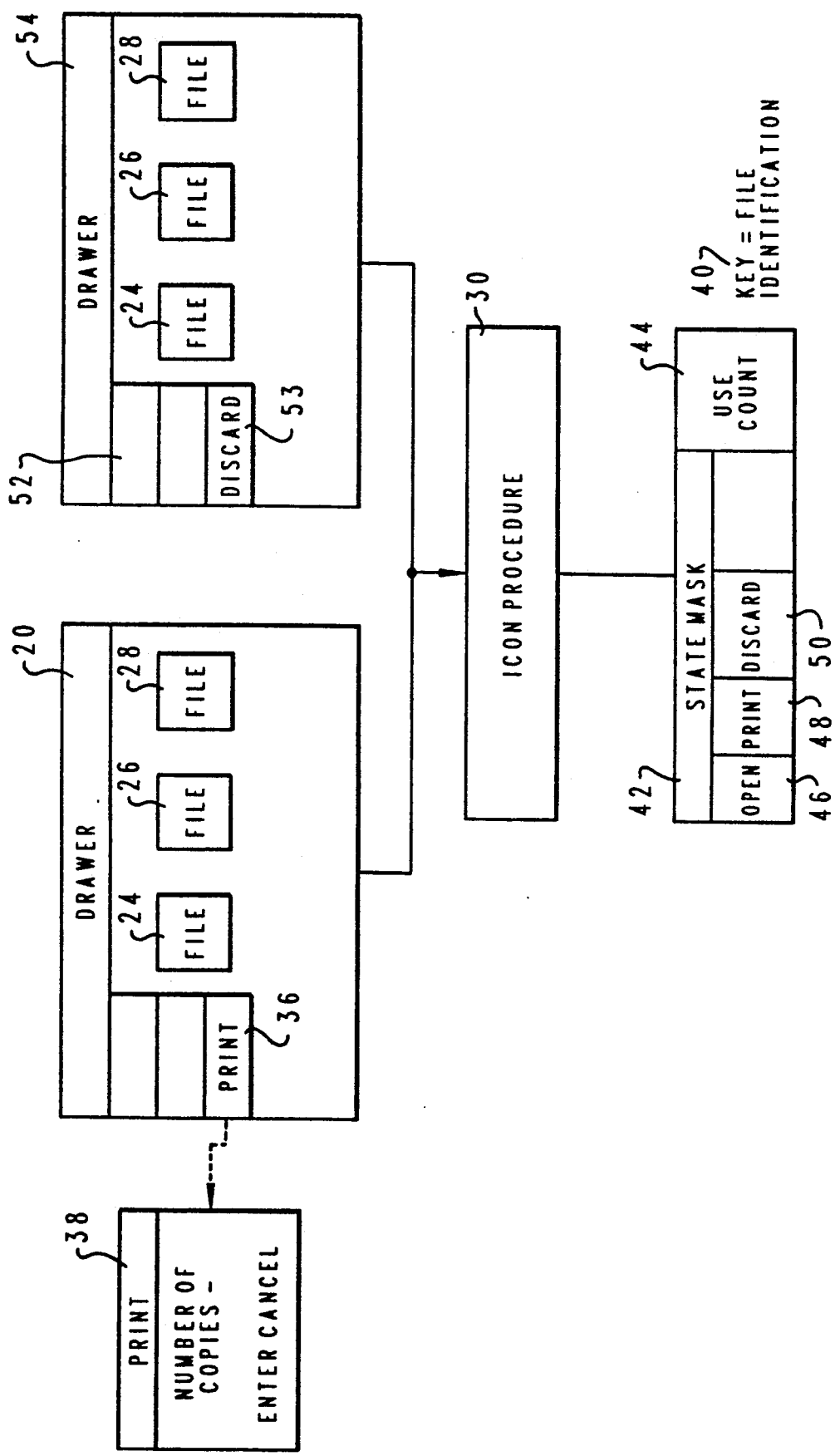
FIG. 3 depicts a pictorial representation of an object graphically represented within two filing cabinet drawers and a schematic representation of the underlying processes which demonstrates two activities with respect to that object.

Referring now to FIG. 3, there is depicted a pictorial representation of an object graphically represented within two filing cabinet drawers and a schematic representation of the underlying processes which demonstrates two activities with respect to that object. A user may open drawer 20 in one filing cabinet and open drawer 54 in a different filing cabinet. The user may select print 36 within drawer 20, for file 24. Key 40 will be automatically created, if it does not already exist, and use count 44 will be incremented. Icon procedure 30 then accesses state mask 42 to determine if there are any current conflicting activities with respect to file 24. Since there are no conflicting activities, icon procedure 30 sets print bit 48. Print interface 38 is then displayed. Any other icon procedure within the data processing system may now utilize state mask 42 to determine if a proposed activity will conflict with the current print activity.

A user might next select discard option 53 within drawer 54, with respect to file 24. Icon procedure 30 utilizes state mask 42 and determines that print bit 48 is set and therefore a conflicting activity is in progress. Icon procedure 30 then disables discard option 53. Discard option 53 remains disabled as long as it appears displayed. Once printing has completed, icon procedure 30 will reset print bit 48. After print bit 48 is reset, discard option 53 will appear enabled upon a user reselecting menu 52.

The user may then choose to discard. Upon the user reselecting menu 52, discard option 53 will remain enabled to indicate that a discard may occur. If the user chooses to discard file 24, icon procedure 30 will set discard bit 50. Any other icon procedure may now access state mask 42 to determine if a proposed activity will conflict with the current discard activity. After discarding is completed, icon procedure 30 will then reset discard bit 50.

Figure 4:
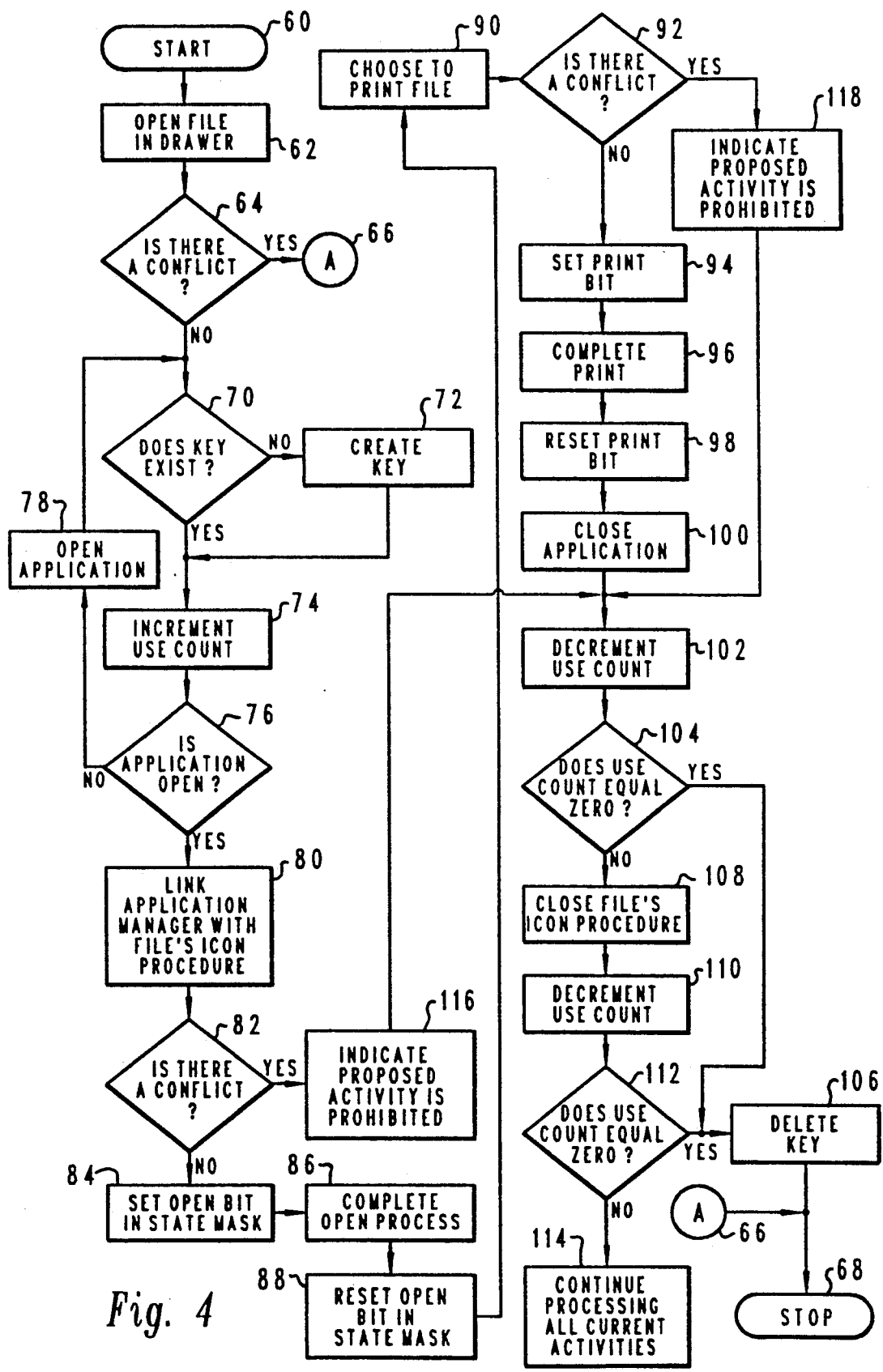
FIG. 4 depicts a high level flow chart illustrating a software implementation of the present invention which illustrates the utilization of a use count, key, and state mask when an activity is performed on an opened file.

Referring now to FIG. 4, there is depicted a high level flow chart illustrating a software implementation of the present invention which illustrates the utilization of a use count, key, and state mask when an activity is performed on an opened file. The process begins at block 60 and thereafter passes to block 62 which depicts a user opening a file in one drawer of a filing cabinet. The process next passes to block 64 which illustrates a determination of whether or not there is a conflict between an existing activity and the opening of the particular file. If a determination is made that there is a conflict, the process passes to block 66. Thereafter, the process terminates at block 68.

Referring again to block 64, if a determination is made that there is not a conflict, the process passes to block 70 which depicts a determination of whether or not a key for the particular file exists. If a determination is made that a key for the particular file does not exist, the process passes to block 72 which depicts the automatic creation of a key. Thereafter, the process passes to block 74 which illustrates the incrementing of the use count.

Referring again to block 70, if a determination is made that a key does exist for the particular file, the process passes to block 74. Thereafter, the process passes to block 76, which depicts a determination of whether or not an application associated with the particular file has already been opened. If a determination is made that the application has not already been opened, the process passes to block 78 which illustrates opening the application. The process thereafter passes again to block 70. Referring again to block 76, if a determination is made that the application associated with the particular file has already been opened, the process passes to block 80.

Block 80 illustrates the linking of an application manager associated with the particular application to an icon procedure associated with the particular file. Next, block 82 depicts a state mask being utilized to determine whether or not the proposed activity of opening the file will conflict with any current activity. If a determination is made that the proposed activity is not a conflict with any current activity, the process passes to block 84 which depicts the utilizing of the state mask to set an "open" bit. Thereafter, the process passes to block 86 which illustrates completing the process of opening the file. Next, block 88 depicts utilizing the state mask to reset the "open" bit in order to indicate that the "open" process has been completed.

Referring now to block 90, there is illustrated a user choosing to print the particular file. The process next passes to block 92 which illustrates a determination of whether or not there is a conflict between the proposed "print" and a current activity. If a determination is made that there is not a conflict, the process then passes to block 94 which depicts utilizing the state mask to set a "print" bit. The process next passes to block 96 which depicts completing the process of printing the file. Thereafter, the process passes to block 98 which depicts utilizing the state mask to reset the "print" bit to indicate that the "print" process has been completed.

Next, block 100 depicts a user closing the application. The process, thereafter, passes to block 102 which illustrates a decrementing of the use count. Next, block 104 depicts a determination of whether or not the use count is equal to zero. If a determination is made that the use count is equal to zero, the process passes to block 106 which illustrates the automatic deleting of the key. The process then terminates, as illustrated at block 68.

Referring again to block 104, if a determination is made that the use count is not equal to zero, the process passes to block 108 which illustrates closing the icon procedure associated with the particular file. Thereafter, block 110 depicts the decrementing of the use count. The process then passes to block 112 which illustrates a determination of whether or not the use count is now equal to zero. If a determination is made that the use count does not equal zero, the process passes to block 114 which depicts continuing all current activities. Referring again to block 112, if a determination is made that the use count does equal zero, the process passes back to block 106. As above, block 106 illustrates the automatic deleting of the key and the process then terminates, as depicted at block 100.

Referring again to block 82, if a determination is made that there is a conflict, the process passes to block 116 which illustrates indicating that the proposed activity is prohibited. Thereafter, the process passes to block 102.

Referring again to block 92, if a determination is made that there is a conflict, the process passes to block 118 which illustrates indicating that the proposed activity is prohibited. Thereafter, the process passes to block 102.

Upon reference to the foregoing, those skilled in the art will appreciate that the Applicants have provided an improved method and system whereby conflicting activities with respect to an object stored within a data processing system are minimized.

While the invention has been particularly shown and described with reference to a preferred embodiment, it will be understood by those skilled in the art that various changes in form and detail may be made therein without departing from the spirit and scope of the invention.

We claim:

1. A method in a data processing system for minimizing conflicting activities by one or more users within said data processing system with respect to an object stored therein, said method comprising the steps of:

establishing a state mask in association with an object which may be the subject of multiple activities by one or more users within said data processing system;

storing within said state mask a record of all current activities with respect to said object; and, prior to permitting a proposed activity by a user within said data processing system, automatically determining if said proposed activity represents a conflict with a current activity by accessing said state mask to determine a status for each current activity.

2. The method in a data processing system for minimizing conflicting activities with respect to an object stored therein according to claim 1, wherein each object has multiple user selectable iconic representations associated therewith to be utilized for graphic selection of a particular activity with respect to said object.

3. The method in a data processing system for minimizing conflicting activities with respect to an object stored therein according to claim 1, further including the step of if said proposed activity represents a conflict with an existing activity, prohibiting said proposed activity.

4. The method in a data processing system for minimizing conflicting activities with respect to an object stored therein according to claim 1, wherein said state mask includes a use count for providing an indication of a number of current activities.

5. The method in a data processing system for minimizing conflicting activities with respect to an object stored therein according to claim 4, wherein said use count is incremented upon each initiation of an activity with respect to said object, wherein an efficient determination of total activity may be maintained.

6. The method in a data processing system for minimizing conflicting activities with respect to an object stored therein according to claim 4, wherein said use count is decremented upon each cessation of an activity with respect to said object, wherein an efficient determination of total activity may be maintained.

7. A method in a data processing system for minimizing conflicting activities by one or more users within said data processing system with respect to an object stored therein, said object having multiple iconic representations which may be utilized for graphically selecting said object, said method comprising the steps of:
 providing an object manager for controlling all activities with respect to said object;
 establishing a state mask in association with said object manager for storing a record of all current activities with respect to said object; and,
 prior to permitting a proposed activity by a user within said data processing system, determining if said proposed activity represents a conflict with a current activity by accessing said state mask to determine a status for each current activity.

8. A method in a data processing system for minimizing conflicting activities with respect to an object stored therein according to claim 7, wherein each proposed activity requires the assertion of a key which includes an identification for a particular object.

9. A method in a data processing system for minimizing conflicting activities with respect to an object stored therein according to claim 7, further including the step of if said proposed activity represents a conflict with an existing activity, prohibiting said proposed activity.

10. A method in a data processing system for minimizing conflicting activities with respect to an object stored therein according to claim 7, wherein said state mask includes a use count for providing an indication of a number of current activities.

11. A method in a data processing system for minimizing conflicting activities with respect to an object stored therein according to claim 10, wherein said use count is incremented upon each initiation of an activity with respect to said object, wherein an efficient determination of total activity may be maintained.

12. A method in a data processing system for minimizing conflicting activities with respect to an object stored therein according to claim 10, wherein said use count is decremented upon each cessation of an activity with respect to said object, wherein an efficient determination of total activity may be maintained.

13. A data processing system for minimizing conflicting activities by one or more users within said data processing system with respect to an object stored therein, said data processing system comprising:
 means for establishing a state mask in association with an object which may be the subject of multiple activities by one or more users within said data processing system;
 means for storing within said state mask a record of all current activities with respect to said object; and,
 means for automatically determining if a proposed activity represents a conflict with a current activity by accessing said state mask prior to permitting said proposed activity to determine a status for each current activity.

14. The system for minimizing conflicting activities with respect to an object stored therein according to claim 13, wherein each object has multiple user selectable iconic representations associated therewith to be utilized for graphic selection of a particular activity with respect to said object.

15. The system for minimizing conflicting activities with respect to an object stored therein according to claim 13, further comprising means for prohibiting said proposed activity if said proposed activity represents a conflict with an existing activity.

16. The system for minimizing conflicting activities with respect to an object stored therein according to claim 13, wherein said state mask includes a use count means for providing an indication of a number of current activities.

17. The system for minimizing conflicting activities with respect to an object stored therein according to claim 16, wherein said use count is incremented upon each initiation of an activity with respect to said object, wherein an efficient determination of total activity may be maintained.

18. The system for minimizing conflicting activities with respect to an object stored therein according to claim 16, wherein said use count is decremented upon each cessation of an activity with respect to said object, wherein an efficient determination of total activity may be maintained.

19. A data processing system for minimizing conflicting activities by one or more users within said data processing system with respect to an object stored therein, said object having multiple iconic representations which may be utilized for graphically selecting said object, said data processing system comprising:
 an object manager for controlling all activities with respect to said object;
 means for establishing a state mask in association with said object manager for storing a record of all current activities with respect to said object; and,
 means for determining if a proposed activity by a user within said data processing system represents a conflict with a current activity by accessing said state mask prior to permitting a proposed activity to determine a status for each current activity.

20. The system for minimizing conflicting activities with respect to an object stored therein according to claim 19, further including a key which must be asserted, wherein said key includes an identification for a particular object.

21. The system for minimizing conflicting activities with respect to an object stored therein according to claim 19, further comprising means for prohibiting said proposed activity if said proposed activity represents a conflict with an existing activity.

22. The system for minimizing conflicting activities with respect to an object stored therein according to claim 19, wherein said state mask includes a use count for providing an indication of a number of current activities.

23. The system for minimizing conflicting activities with respect to an object stored therein according to claim 22, further including means for incrementing said use count upon each initiation of an activity with respect to said object, wherein an efficient determination of total activity may be maintained.

24. The system for minimizing conflicting activities with respect to an object stored therein according to claim 22, further including means for decrementing said use count upon each cessation of an activity with respect to said object, wherein an efficient determination of total activity may be maintained.

* * * * *